UNITED STATES PATENT OFFICE.

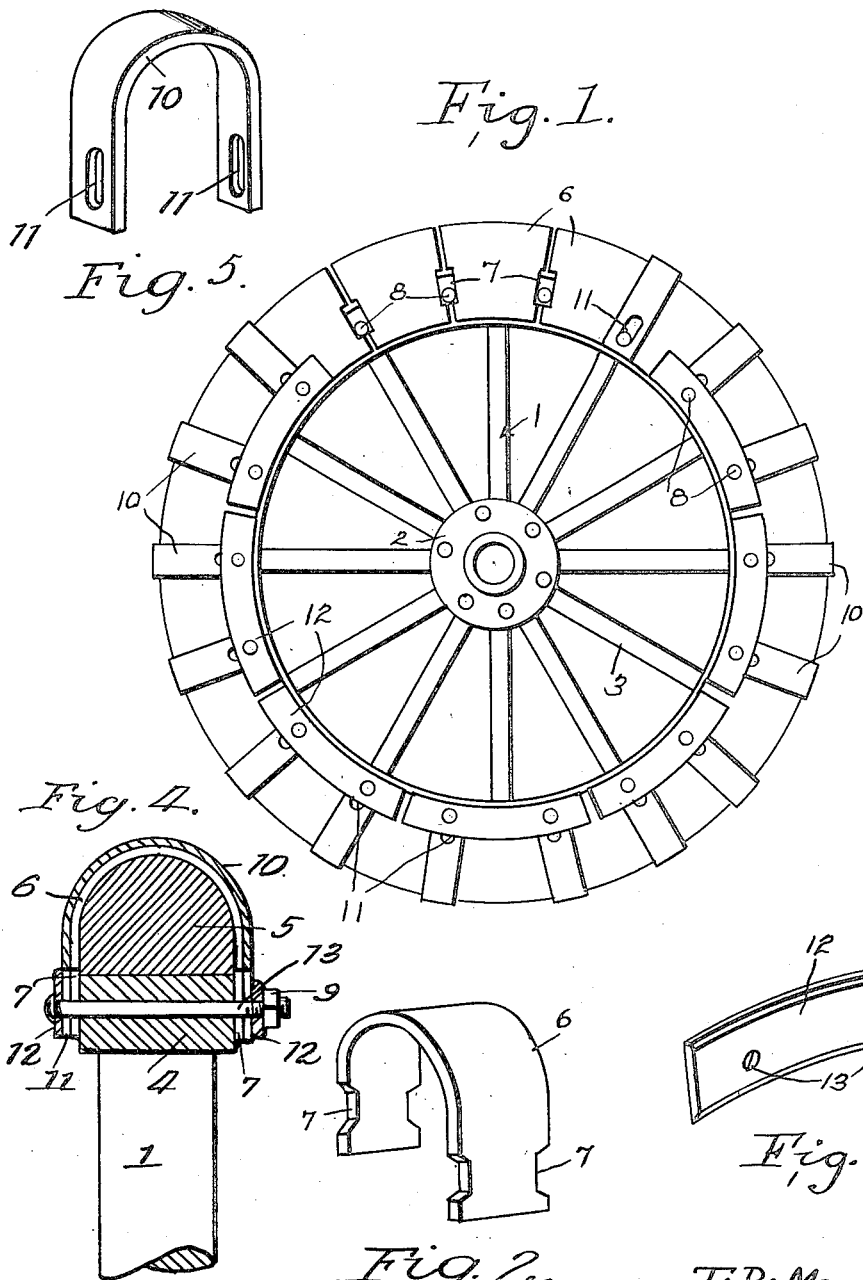

THOMAS P. MARCOTTE, OF WEST POLAND, MAINE.

TIRE-ARMOR.

1,125,857.   Specification of Letters Patent.   Patented Jan. 19, 1915.

Application filed April 21, 1914. Serial No. 833,499.

*To all whom it may concern:*

Be it known that I, THOMAS P. MARCOTTE, a citizen of the United States, residing at West Poland, in the county of Androscoggin and State of Maine, have invented certain new and useful Improvements in Tire-Armor; and I do hereby declare the following to be a full, clear, and exact description of the invention, such as will enable others skilled in the art to which it appertains to make and use the same.

My invention relates to new and useful improvements in tires and more particularly to attachments therefor which comprises armor that may be readily and easily attached to tires and will prevent punctures and wear.

An important object of my invention is to provide tire armor of the character described which comprises a plurality of segmental armor sections each being U-shaped in cross section and arranged to incase the tire, said sections being arranged to be fitted together to form a casing for the tire.

Another important object of my invention is to provide novel means for clamping the sections along their meeting edges, which projects beyond the surface of the armor and act to prevent skidding.

Another important object of my invention is to provide a tire of the character described which is simple as to construction, reliable and efficient in operation, capable of being readily attached and detached and which is cheap to manufacture.

The above and additional objects are accomplished by such means as are illustrated in the accompanying drawings described in the following specification and then more particularly pointed out as claimed.

With reference to the drawings, wherein I have illustrated the preferred embodiment of my invention as it is reduced to practice, and throughout the several views of which similar reference numbers designate corresponding parts, Figure 1 is a side elevation showing my improved armor in assembled operative position, Fig. 2 is a detail perspective view of one of the armor sections, Fig. 3 is a detail perspective view of one of the clamping plates, Fig. 4 is a vertical sectional view taken through Fig. 1, and Fig. 5 is a detail perspective view of one of the clamping members.

Referring to the drawings by characters of reference, the numeral 1 designates as an entirety, a vehicle wheel which comprises the usual hub 2, spokes 3 and felly 4.

A tire 5 is mounted upon the felly 4 and as illustrated is of the solid cushion type. In this connection it is to be noted that my invention is applicable to pneumatic tires as well as solid.

My improved armor comprises a plurality of segmental sections 6 each being U-shaped. Each of the sections 6 is provided adjacent its end upon opposite side edges thereof with recesses 7, to provide spaces to accommodate fastening means when the sections are fitted in engagement with each other along their edges upon the tire.

As a means for securing the sections 6 upon the tire I employ bolts 8 that are inserted transversely through the felly 4 and extend into the recesses 7 of the sections, the sections being previously fitted upon the tire so that the sides thereof overlap the sides of the felly 4 as clearly shown in Fig. 4 in the drawings. Nuts 9 are turned upon the unheaded terminals of the bolts 8.

As a means for securely holding the sections 6 in proper engagement with each other and in position upon the tire, I employ U-shaped clamping members 10 that are provided with their longitudinal slots 11 adjacent their ends. These clamping members 10 are fitted upon the sections 6 so as to overlie the meeting edges of the sections thus providing a tight joint. The bolts 8 are inserted through the slots 11, said slots being positioned in registration with the openings formed by the recesses 7. The members 10 project beyond the surface of the sections 6 of the armor and provide an irregular tread surface which will serve to prevent skidding and enable the wheel to grip in starting or stopping.

I also provide segmental clamping plates 12 having apertures 13 adjacent each end. The clamping plates 12 are positioned in engagement with the end portions of the members 10 and receive the bolts 8 through the apertures 13. These clamping plates 12 serve to securely hold the clamping members 10 and sections 6 comprising the armor in the proper position upon the tire. It will be noted that the sections 6 fit snugly about the felly and tire and that the clamping members 10 snugly clamp the members 6 at their meeting edges. This arrangement insures the proper protection of the tire and prevents derangement of the armor incident to its coming into contact with stones and irregularities in the road way.

It will also be noted that my device may be quickly assembled and disassembled and should any part or section become deranged or broken so as to interfere, it may be readily removed without necessitating the removal of the entire armor. While I have shown the clamping plate 12 operating in connection with two of the members 10 it is to be understood this arrangement may be changed as desired.

The forming of the recesses 7 will enable the reception of the bolts 8, dispenses with fastening means for the different elements of the device and serves to hold the members 6 securely in place. The recesses 7 and slots 11 provide for the tangential movement occasioned under driving strain and when the vehicle is at rest and the weight thereof placed upon the tire thus permitting the necessary resilient action to prevent derangement of the armor.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. A tire armor comprising a plurality of segmental sections each being provided adjacent its ends with recesses upon the opposite side edges thereof, U-shaped clamping members mounted upon and engaging said sections adjacent their meeting edges and provided with longitudinal slots alining with said recesses and bolts extended through said slots and recesses, said bolts being slidable with relation to the recesses and slots to permit tangential movement of said sections.

2. A tire armor comprising a plurality of segmental sections adapted to incase a tire and engage the sides of the felly of a wheel, said sections being arranged in engagement with each other along their end edges, U-shaped clamping members mounted upon and engaging said sections adjacent their end edges, said clamping members covering the meeting edges of said sections and being provided with longitudinal slots at their ends, said sections each having recesses upon their side edges adjacent the ends thereof, said recesses being disposed in alinement with said slots, bolts inserted through the slots, recesses and felly of the wheel, said bolts being slidable with relation to said recesses and segmental clamping plates arranged upon opposite sides of said sections and clamping members, said bolts extending through said clamping plates.

In testimony whereof I affix my signature in presence of two witnesses.

THOMAS P. MARCOTTE.

Witnesses:
　JESSE M. LIBBY,
　F. GUY CAMPBELL.